United States Patent Office 2,946,702
Patented July 26, 1960

2,946,702

HIGH SOLIDS VINYL DISPERSIONS

Henry J. Bach, Mount Lebanon Township, Allegheny County, Pa., assignor, by mesne assignments, to American-Marietta Company, Stoner-Mudge Co. Division, Chicago, Ill., a corporation of Illinois No Drawing. Filed Aug. 31, 1956, Ser. No. 607,260

10 Claims. (Cl. 117—75)

This invention relates to preparation and use of high molecular weight polyvinyl resin dispersions, particularly for coating metal surfaces, and to the resultant coated metal articles.

The polyvinyl resins usually employed in coating and like compositions are dissolved, at solid concentrations of about 15% to about 30%, in conventional solvent mixtures of ketone and ester solvents, with varying amounts of liquid aromatic hydrocarbon diluents. In order to avoid excessively high viscosities, the polyvinyl resins used in such compositions must have relatively low molecular weight, generally below 20,000. In order to avoid use of such large proportions of solvents, and to use higher molecular weight polyvinyl resins, which have superior qualities of physical strength and corrosion resistance, and to obtain a thicker coating with one application of the composition, other forms of coating and like compositions have been developed known as dispersions, and more specifically as organosols and plastisols, in whcih the high molecular weight polyvinyl resins are admixed with plasticizers and sometimes volatile liquid diluents (e.g., butyl ether of diethylene glycol). However, the preparation and application of such dispersions has presented a difficult problem because, on the one hand, the use of a high percentage of the plasticizer component (ordinarily in the range of about 40% to about 150% of the resin component) reduces the physical strength and hardness of the film formed by the composition, and, on the other hand, the use of a relatively low percentage of plasticizer, in order to obtain greater film strength, toughness, abrasion resistance and the like, in conjunction with a volatile diluent to assist in softening and dispersing the resin, results in a composition which cannot be applied at thicknesses of more than about 3 mils in a single application (measured on the cured film), without developing film blisters and like imperfections, caused by the escaping solvent and diluent, when baked at temperatures of about 400° F. or higher.

The polyvinyl resin dispersions of the present invention are capable of being applied in a single application at thicknesses of as much as 20 mils, for example, and of being fused at baking temperatures of 400° F. or more, without developing film blisters or the like. The dispersions of the invention can be formulated for application at lesser thicknesses, such as a mil or less. Also, lower baking temperatures can be used, with a corresponding increase in curing time. The coatings obtained in accordance with the invention have less than the usual proportion of plasticizer, and have superior qualities of film toughness, abrasion resistance and the like, and high corrosion resistance. The dispersions of the invention form a tough, adherent coating, and are particularly useful in coating steel pipe and tubing, flat sheet steel to be subsequently fabricated into cans, closures, screw caps, panels, toys and other articles, and wire for electrical conductors and other purposes. The corrosion resistance of the coating also makes it particularly useful in lining containers for various corrosive chemicals.

The essential components of the dispersion of the invention are a film-forming polyvinyl resin component, a non-volatile primary plasticizer component for swelling and fusing the resin, and a volatile liquid dispersant component which lowers the viscosity of the dispersion for purposes of application, and assists in fusing the resin component at fusing temperatures.

The resin component of the dispersion of the invention is a thermoplastic polyvinyl resin having an average molecular weight in excess of 20,000 (usually not over about 50,000, but extending to higher ranges of 100,000, for example, or more, without any upper limit as regards operability for the purposes of this invention), and made from vinyl chloride in major amount (more than half of the total constituents of the resin), or a mixture of such resin. Such resins are well known in the art, and include the solid thermoplastic polymers and copolymers derived from vinyl chloride, alone, or conjointly with vinylidene chloride, or an ester of vinyl alcohol (e.g., vinyl acetate). The present preferred exaxmple of the resin component of the dispersion of the invention is polyvinyl chloride, e.g., "Geon 121" of B. F. Goodrich Chemical Co., Cleveland, Ohio, a polyvinyl chloride resin having a specific gravity of about 1.41 and a specific viscosity of about 0.40 (0.4% solution in nitrobenzene at 20° C.). Other examples are copolymers of vinyl chloride (about 95% by weight) and vinyl acetate (about 5% by weight), having specific gravities of about 1.39 and specific viscosities of about 1.53 in cyclohexanone at 20° C.; and the "Vinylite VYNV" series of resins of Union Carbide & Carbon Corp., New York N.Y., and "Geon 202" of B. F. Goodrich Chemical Co., a vinyl chloride and vinylidene chloride copolymer having a specific gravity of 1.41 and a specific viscosity of about 0.40 (0.4% solution in nitrobenzene at 20° C.).

The plasticizer component of the dispersion of the invention may be any one or a mixture of a wide variety of chemical plasticizers commonly used for plasticizing the polyvinyl resin component described above; e.g., the alkyl and aryl derivatives of organic acids, such as phthalates, pelargonates, glyconates, sebacates, adipates, azelates, phosphates and certain plasticizing petroleum oil fractions. The present preferred example of the plasticizer component is dioctyl phthalate, but it is not critical for the purposes of the invention. Various single or mixed plasticizers may be selected for special applications, in order to obtain particular fused film properties such as low temperature flexibility, low plasticizer volatility, non-migration, non-toxicity, non-flammability, water resistance, and the like.

The volatile liquid dispersant component of the dispersion of the invention is composed of mixed aromatic alkyl substituted polynuclear hydrocarbons, having a specific gravity of about one, a mixed aniline point of about 26° to about 30° C., a distillation range (ASTM D86–52T) of about 150° C. to about 450° C., and characterized by ability to aid the plasticizer component in dispersing the resin component, and by ability to evaporate most (preferably about 95%) of its weight out of films of the composition of the invention when baked, for example, for a period of about 5 minutes at 425° F. In order for such volatilization to take place in an even progression, thus avoiding blistering, it is necessary for the volatile liquid dispersant to have substantially evenly increasing percentages by weight which have evenly increasing boiling points within the boiling range of the volatile liquid dispersant. The present preferred example of the dispersant component of the invention is a hydrocarbon mixture of the kind described, of coal tar origin, known as "DiPolymer Oil" of Pennsylvania Industrial Chemical Corporation, Clairton, Pennsylvania. It and other examples of the volatile liquid dispersant component of the invention which are hydrocarbon mixtures of the kind described, of coal tar origin, have the following characteristics based on typical analyses (Example A being the said "DiPolymer Oil"):

TABLE I.—VOLATILE LIQUID DISPERSANT EXAMPLES

| (1) Distillation range | (b) Temperature (° C.) | | | |
|---|---|---|---|---|
| | Ex. A | Ex. B | Ex. C | Ex. D |
| (a) Percent by weight boiling at stated temperature: | | | | |
| 0 | 205 | 150 | 200 | 156 |
| 5 | 237 | 182 | 241 | 187 |
| 10 | 253 | 198 | 258 | 208 |
| 20 | 265 | 210 | 275 | 231 |
| 30 | 277 | 222 | 292 | 253 |
| 40 | 284 | 229 | 304 | 270 |
| 50 | 295 | 240 | 320 | 291 |
| 60 | 307 | 252 | 337 | 313 |
| 70 | 323 | 268 | 358 | 339 |
| 80 | 344 | 289 | 384 | 368 |
| 90 | 368 | 313 | 413 | 404 |
| 95 | 396 | 341 | 441 | 435 |
| Dry | 398 | 344 | 450 | 443 |
| (2) Specific gravity at 15.5° C | 0.99 | .98 | 1.00 | .99 |
| (3) Mixed aniline point | 28 | 26 | 27 | 30 |

For the purposes of the invention, the amount of the primary plasticizer component must be in the range of about 2% to about 25% of the combined weight of said primary plasticizer component and the resin component, such range limits being necessary to obtain films having the quality sought for the purposes of the invention. The volatile liquid dispersant component must be present in amount sufficient to make the dispersion fluid, which amount can be in the range of about 5% to about 70%, and preferably is in the range of about 35% to about 55%, of the combined weight of all three components in the composition of the invention. The combination of these ranges produces a viscosity from about 30 seconds to about 300 seconds in No. 4 Ford cup at 80° F., which is sufficient to permit application by the various conventional coating methods, such as spraying, roller coating, dipping and brushing. The thickness of the fused coated film which may be deposited in a single application may be varied by adjusting the viscosity of the composition, by adjusting the proportions of the plasticizer or volatile liquid dispersant component, or both, and coating thicknesses can thus be obtained ranging from less than 1 mil to more than 20 mils. Such coatings are notably strong, hard and unblistered, and essentially free of the volatile liquid dispersant component, after being sufficiently baked; e.g., for 5 minutes at 425° F. The baking temperature should be at least about 400° F., but can be increased virtually without limit by suitable control of the baking time. The baking time can be reduced in the case of the thinner coatings, and can be reduced as the baking temperature is increased. Even the thickest of the above-mentioned films are free of blisters, pits, film cracking and similar film imperfections of the kind caused by conventional volatile diluents.

The following Table II illustrates examples of compositions of the invention, and their properties when applied and baked on specimens of primed blackplate:

TABLE II

| | Example A | Example B |
|---|---|---|
| (1) Parts by weight of components: | | |
| (a) Resin ("Geon 121") | 44.7 | 51.7 |
| (b) Plasticizer (dioctyl phthalate) | 9.1 | 5.70 |
| (c) Volatile liquid dispersant ("DiPolymer Oil") | 46.2 | 42.6 |
| (2) Viscosity in seconds in #4 Ford Cup at 80° F | 110 | 190 |
| (3) Film properties after coating on primed steel and baking 10 minutes at 425° F. (20 mil film): | | |
| (a) Hardness (Shore A Durometer) | 95 | 98 |
| (b) Cracking | None | None |
| (c) Blistering | None | None |

The invention is further illustrated in the following examples:

*Dispersion Example I*

A dispersion consisting of 43.0 parts by weight of high molecular weight polyvinyl chloride resin ("Geon 121"), 8.8 parts of plasticizer (dioctyl phthalate), 44.4 parts of volatile liquid dispersant ("DiPolymer Oil") and 3.8 parts of a suitable thermal stabilizer ("Trimal" of National Lead Co.) is prepared by stirring 15 minutes on a conventional drill press type stirrer. The resulting dispersion has an initial viscosity of about 100 seconds in #4 Ford cup at 80° F. This dispersion is roll coated over primed sheet steel and tin plate at 1–1.5 mils thickness (measured dry) and baked 10 minutes at 425° F. Commercial cans fabricated from the coated plate and test packed with a large variety of chemical products, display excellent corrosion resistance.

*Dispersion Example II*

A small section of steel pipe is preheated to about 300–400° F. and, while hot, spray coated with the dispersion prepared as in Example I, to a fused film thickness of 9 mils, and baked 10 minutes at 425° F. The coating thus applied is tough, abrasion resistant, and free of blisters, cracks and other visible film defects.

The resin dispersion of the invention is preferably applied to metal surfaces, such as tin, steel and aluminum, which have first had a primer coating applied and baked thereon. Conventional primers can be used, such as those shown in the examples of Gray, et al. Patent No. 2,324,078, but it has been found that the primers shown in the said patent examples tend to be softened by the dispersion of the invention, and also do not have as strong adhesion to the dispersion of the invention as a good primer should have.

A preferred primer is as follows:

*Primer Example I*

| Primer Components | Parts by Weight |
|---|---|
| Resin content: | |
| (1) Copolymer of— | |
| Vinyl chloride (90%) | 40 |
| Vinyl acetate (10%) | |
| (2) Copolymer of— | |
| Vinyl chloride (86%) | 40 |
| Vinyl acetate (13%) | |
| Maleic acid (1%) | |
| (3) Primer Resin B | 20 |
| Solvent system: | |
| Xylene | 56 |
| Isophorone | 24 |

The primer composition of the invention is applied to the metal surface and baked at a temperature of about 300° to about 400° F. for a time sufficient to expel the solvent, usually about 5 to 30 minutes. The foregoing Table II and Dispersion Examples I and II employed panels coated with the primer composition shown in Primer Example I above with a primer coating weight of about 1.5 mg./sq. in., and a primer bake of about 10 minutes at 390° F.

Pigments, dyes, and other materials may be added to the dispersions and primer compositions of the invention for decorative purposes and the like, without materially affecting the significant characteristics of the composition. In addition, the dispersions of the invention may be modified with other additives, such as thermal stabilizers, to enhance special properties.

While I have described present preferred embodiments of the invention and methods of practicing the same, it will be recognized that the invention is not limited thereto but may be otherwise variously embodied and practiced within the scope of the following claims.

I claim:

1. A fluid resin dispersion, capable of being spread on a surface and thereafter fused by heating into a hard, stable, continuous, tough and abrasion-resistant coating, comprising resin, plasticizer and volatile liquid dispersant components, said components consisting of (1) solid thermoplastic polyvinyl resin having an average molecular weight in excess of 20,000 and made from vinyl chloride in major amount, (2) plasticizer for the said resin, and (3) volatile liquid dispersant material consisting essentially of mixed aromatic alkyl substituted polynuclear hydrocarbons having a composite specific gravity of about one, a mixed aniline point of about 26° to about 30° C., and a distillation range of about 150° C. to about 450° C., and being characterized by having a series of substantially equal components by weight which have a series of respective boiling points increasing by substantially even increments, the plasticizer component (2) constituting about 5% to about 25% of the combined weight of the resin and plasticizer components (1) and (2), and the volatile liquid dispersant component (3) constituting about 35% to about 55% of the total weight of components (1), (2) and (3), said composition having a viscosity in the range of about 30 seconds to about 300 seconds in No. 4 Ford cup at 80° F., being capable of being applied in a single coating to a film thickness, after fusing, of between 1 mil and about 20 mils, and being capable, when baked at 425° F. for 5 minutes, of releasing most of the said material (3) to the atmosphere without blistering the fused film.

2. A fluid resin dispersion as claimed in claim 1 in which the range of distillation of said dispersant extends over a span of at least substantially 193° C. between said upper and lower limits of distillation temperature.

3. A fluid resin dispersion in accordance with claim 1 in which the volatile liquid dispersant material (3) has a mixed aniline point of about 28, and a distillation range of about 205 to about 398° C.

4. A fluid resin dispersion in accordance with claim 3 in which the resin component (1) is polyvinyl chloride, and the plasticizer component is dioctyl phthalate.

5. A fluid resin dispersion in accordance with claim 4 in which the proportions by weight of components (1), (2) and (3) are about 44.7/9.1/46.2.

6. A fluid resin dispersion in accordance with claim 4 in which the proportions by weight of components (1), (2) and (3) are about 51.7/5.7/42.6.

7. The process of coating a metal surface, comprising applying the fluid resin dispersion of claim 1 thereon, and baking the coated surface at a temperature of at least 400° F. whereby coatings may be produced containing less than about 25% of plasticizer components based on the combined weight of resin and plasticizer and whereby coatings having a thickness in excess of 3 mils may be produced in a single application without developing film blisters and similar imperfections.

8. An article having a metal surface coated in accordance with the process of claim 7.

9. A fluid resin dispersion, capable of being spread on a surface and thereafter fused by heating into a hard, stable, continuous, tough and abrasion-resistant coating, comprising resin, plasticizer, and volatile liquid dispersant components, said components consisting of (1) solid thermoplastic polyvinyl resin having an average molecular weight in excess of 20,000 and made from vinyl chloride in major amount, (2) plasticizer for said resin, and (3) volatile liquid dispersant material consisting essentially of mixed aromatic alkyl substituted polynuclear hydrocarbons having a composite specific gravity of about one, a mixed aniline point of about 26° to about 30° C., and a distillation range of about 150° C. to about 450° C., the plasticizer component (2) constituting about 5% to about 25% of the combined weight of the resin and plasticizer components (1) and (2), and the volatile liquid dispersant component (3) constituting about 35% to about 55% of the total weight of components (1), (2), and (3), said composition having a viscosity in the range of about 30 seconds to about 300 seconds in No. 4 Ford cup at 80° F., being capable, when baked at 425° F. for 5 minutes, of releasing most of the said material (3) to atmosphere.

10. The process of coating a metal surface, comprising applying the fluid resin dispersion of claim 9 thereon and baking the coated surface at a temperature of at least 400° F. whereby coatings may be produced containing less than about 25% of plasticizer components based on the combined weight of resin and plasticizer.

References Cited in the file of this patent

UNITED STATES PATENTS

| | | |
|---|---|---|
| 2,324,078 | Gray et al. | July 13, 1943 |
| 2,431,078 | Powell et al. | Nov. 18, 1947 |
| 2,497,045 | Killingsworth et al. | Feb. 7, 1950 |
| 2,550,232 | Donnell et al. | Apr. 24, 1951 |
| 2,654,719 | Schwencke | Oct. 6, 1953 |

OTHER REFERENCES

Ellis: Synthetic Resins and their Plastics, published by the Chemical Catalog Co. Inc., 1923 (page 125 relied on).